(12) United States Patent
Wässingbo (10) Patent No.: US 8,914,070 B2
(45) Date of Patent: Dec. 16, 2014

(54) MOBILE WIRELESS COMMUNICATION TERMINALS, SYSTEMS AND METHODS FOR PROVIDING A SLIDESHOW

(75) Inventor: Tomas Karl-Axel Wässingbo, Malmö (SE)

(73) Assignee: Thomson Licensing, Issy les Moulineaux (FR)

( * ) Notice: Subject to any disclaimer, the term of this patent is extended or adjusted under 35 U.S.C. 154(b) by 1653 days.

(21) Appl. No.: 12/063,385

(22) PCT Filed: Aug. 22, 2006

(86) PCT No.: PCT/EP2006/065556
§ 371 (c)(1),
(2), (4) Date: Feb. 8, 2008

(87) PCT Pub. No.: WO2007/025910
PCT Pub. Date: Mar. 8, 2007

(65) Prior Publication Data
US 2010/0222107 A1  Sep. 2, 2010

Related U.S. Application Data

(63) Continuation-in-part of application No. 11/216,935, filed on Aug. 31, 2005, now abandoned.

(51) Int. Cl.
*H04M 1/00* (2006.01)
*H04B 1/38* (2006.01)
(Continued)

(52) U.S. Cl.
CPC ....... *H04N 1/00458* (2013.01); *H04N 1/00127* (2013.01); *H04N 1/00453* (2013.01); *H04N 2201/0043* (2013.01); *H04L 67/06* (2013.01);
(Continued)

(58) Field of Classification Search
USPC .............. 455/41.2–41.3, 412.2, 414.1, 414.2, 455/414.3, 457, 503, 517–519, 556.2, 566, 455/567, 418, 419, 420, 41.1, 416; 370/310, 312, 328, 338, 260, 261, 262; 345/1.1, 1.2, 2.1, 3.1; 715/751, 753, 715/758, 835, 838; 709/204, 205, 208, 212
See application file for complete search history.

(56) References Cited

U.S. PATENT DOCUMENTS 5,550,756 A  8/1996  Ohmi et al.
5,956,482 A  9/1999  Agraharam et al.
(Continued)

FOREIGN PATENT DOCUMENTS

EP  1 478 134 A1  11/2004
JP  2003108395  4/2003
(Continued)

OTHER PUBLICATIONS

*Bluetooth Media Center MMV-200*, http://www.sonyericsson.com/spg.jsp?cc=us&lc=en&ver=4000&template=pp4_1_1&zone..., 2 pages, dated Jun. 16, 2006.

(Continued)

*Primary Examiner* — Olumide T Ajibade Akonai
(74) *Attorney, Agent, or Firm* — Robert D. Shedd; Jeffrey M. Navon; Catherine A. Cooper (57) ABSTRACT

A mobile wireless communication terminal includes a wireless communication module and a controller. The wireless communication module is configured to communicate with other communication terminals over at least one direct point-to-point wireless interface. The controller is configured to establish a connection with each of a plurality of participant wireless communication terminals via the wireless communication module, to receive an image send command from a user, and to send a digital image file over the at least one direct point-to-point wireless interface to each of the plurality of participant wireless communication terminals as a group responsive to the image send command.

23 Claims, 4 Drawing Sheets

(51) Int. Cl.
  *H04N 1/00* (2006.01)
  *H04L 29/08* (2006.01)
  *H04N 1/32* (2006.01)
  *H04W 84/18* (2009.01)
  *H04W 4/06* (2009.01)

(52) U.S. Cl.
  CPC ....... *H04N 1/32069* (2013.01); *H04N 1/00461* (2013.01); *H04N 1/32085* (2013.01); *H04N 2201/0036* (2013.01); *H04N 1/00315* (2013.01); *H04W 84/18* (2013.01); *H04N 1/00204* (2013.01); *H04W 4/06* (2013.01); *H04N 1/003307* (2013.01); *H04N 2201/0055* (2013.01)
  USPC ........... 455/566; 455/416; 455/418; 455/420; 455/518; 455/519; 455/41.2; 370/260; 370/261; 370/262; 370/338; 709/204; 709/205; 709/208; 709/212; 715/751; 715/753; 715/758; 715/835; 715/838

(56) References Cited

U.S. PATENT DOCUMENTS

| | | | |
|---|---|---|---|
| 6,674,881 B2* | 1/2004 | Bacus et al. | 382/128 |
| 6,754,178 B1 | 6/2004 | Sasaki | |
| 6,826,417 B2* | 11/2004 | Seignol et al. | 455/566 |
| 7,458,030 B2* | 11/2008 | Kirn et al. | 715/751 |
| 7,492,472 B2* | 2/2009 | Penke et al. | 358/1.15 |
| 7,509,377 B2* | 3/2009 | Harvey et al. | 709/206 |
| 7,617,279 B2* | 11/2009 | Nakajima et al. | 709/204 |
| 7,710,349 B2* | 5/2010 | De Leon | 345/1.1 |
| 7,729,298 B2* | 6/2010 | Velagaleti et al. | 370/260 |
| 8,443,040 B2* | 5/2013 | Schauser et al. | 709/204 |
| 2002/0038346 A1* | 3/2002 | Morrison et al. | 709/205 |
| 2003/0227478 A1 | 12/2003 | Chatfield | |
| 2004/0136338 A1 | 7/2004 | Lin et al. | |
| 2004/0153504 A1* | 8/2004 | Hutchinson et al. | 709/204 |
| 2004/0259581 A1 | 12/2004 | Crisler et al. | |
| 2005/0107073 A1 | 5/2005 | Cheiky et al. | |
| 2005/0165795 A1* | 7/2005 | Myka et al. | 707/100 |
| 2005/0197141 A1 | 9/2005 | Jiang et al. | |
| 2006/0046755 A1* | 3/2006 | Kies | 455/518 |
| 2006/0146765 A1* | 7/2006 | Van De Sluis et al. | 370/338 |
| 2006/0170956 A1* | 8/2006 | Jung et al. | 358/1.15 |
| 2006/0174206 A1* | 8/2006 | Jung et al. | 715/751 |
| 2006/0265349 A1 | 11/2006 | Hicken | |
| 2007/0050448 A1* | 3/2007 | Gonen et al. | 709/204 |

FOREIGN PATENT DOCUMENTS

| | | |
|---|---|---|
| JP | 2005-039772 | 2/2005 |
| JP | 2005117141 | 4/2005 |
| JP | 2005-210328 | 8/2005 |
| JP | 2005-223722 | 8/2005 |
| WO | WO 2005/062158 A1 | 7/2005 |
| WO | WO 2005/112422 A1 | 11/2005 |

OTHER PUBLICATIONS

*Bluetooth Media Center MMV-200*, http://www.sonyericsson.com/spg.jsp?cc=us&lc=en&ver=4000&page=php1_10252&pid= . . . , 2 pages, dated Jun. 16, 2006.

International Search Report and the Written Opinion of the International Searching Authority for PCT Application No. PCT/EP2006/065556 mailed Oct. 18, 2006.

Jones et al., "Emerging Technologies," Language Learning and Technology, Jan. 2002, vol. 6 (1), pp. 6-10.

*MMS—Share the good times*, http://www.ericsson.com/mms/, 3 pages, dated Jul. 11, 2005.

*Sony Ericsson Bluetooth Media Center MMV-200*, http://www.mobiletechnews.com/info/2005/03/02/021650.html, 1 page, dated Jun. 16, 2006.

*Sony Ericsson unveils the Bluetooth Media Viewer MMV100 printer friendly*, http://www.pocket-lint.com.uk/printnews.php?newsId=238, 1 page, dated Jul. 11, 2005.

*Trust—Bluetooth information*, http://www.trust.com/service/help/bluetooth/default.aspx, 12 pages, dated Jul. 11, 2005.

Notice of First Office Action issued Dec. 24, 2010 during examination of the corresponding Japanese patent application No. 2008-528478 (2 pages).

Notice of Final Office Action issued Mar. 25, 2011 during examination of the corresponding Japanese patent application No. 2008-528478 (2 pages).

* cited by examiner

FIG. 5 ically.
MOBILE WIRELESS COMMUNICATION TERMINALS, SYSTEMS AND METHODS FOR PROVIDING A SLIDESHOW

RELATED APPLICATION

This application is a 35 U.S.C. §371 national stage application of PCT Application No. PCT/EP2006/065556, filed on Aug. 22, 2006, which claims priority from U.S. patent application Ser. No. 11/216,935, filed Aug. 31, 2005, the disclosure and content of each of which are incorporated by reference herein in their entireties. The above-referenced PCT International Application was published in the English language as International Publication No. WO 2007/025910 A1.

FIELD OF THE INVENTION

The present invention relates to electronic devices and, more particularly, to electronic devices and methods for displaying images.

BACKGROUND OF THE INVENTION

Mobile electronic devices, such as wireless communication terminals (e.g., cellular telephones), are widely used to store and display digital image files (e.g., data files representing still images such as digital photographs or pictures). A user may wish to share picture files stored on his own mobile electronic device with one or more other people nearby. One way to do this is to display the images on the user's own mobile electronic device for the others to view. However, this approach may not be feasible or convenient. If the other people have mobile electronic devices of their own, the user may send his picture files to the other mobile electronic devices one-by-one using multimedia messaging service (MMS) or a point-to-point interface (e.g., a Bluetooth or infrared (IR) interface), for example. The user may also display the pictures on another device such as a media center (e.g., a PC or laptop, a television, an audio receiver, etc.), if available. The media center may be equipped with a suitable communication module, which may be an integrated module or an auxiliary (e.g., plug-in) module to allow communication across a point-to-point interface (e.g., a Bluetooth or infrared (IR) interface).

SUMMARY OF THE INVENTION

According to embodiments of the present invention, a mobile wireless communication terminal includes a wireless communication module and a controller. The wireless communication module is configured to communicate with other communication terminals over at least one direct point-to-point wireless interface. The controller is configured to establish a connection with each of a plurality of participant wireless communication terminals via the wireless communication module, to receive an image send command from a user, and to send a digital image file over the at least one direct point-to-point wireless interface to each of the plurality of participant wireless communication terminals as a group responsive to the image send command.

The controller may be configured to send the digital image file to each of the plurality of participant wireless communication terminals as a group such that the digital image file is simultaneously displayed on respective displays of each of the plurality of wireless communication terminals.

The controller may be configured to send the digital image file to each of the plurality of participant wireless communication terminals as a group substantially simultaneously responsive to the image send command.

According to some embodiments, the controller is configured to establish a slideshow session with each of the plurality of participant wireless communication terminals via the wireless communication module, and to send a series of digital image files to each of the plurality of participant wireless communication terminals via the at least one direct point-to-point wireless interface during the slideshow session such that the digital images are automatically displayed on respective displays of each of the plurality of participant wireless communication terminals. The controller can be configured to send the series of digital image files to the plurality of participant wireless communication terminals in a temporally spaced apart sequence.

According to some embodiments, the controller is configured to send an invitation signal to each of the participant wireless communication terminals to participate in a slideshow session, and to receive an acceptance signal from each of the participant wireless communication terminals to participate in the slideshow session. The wireless communication terminal may include a memory and a predefined list designating potential participant wireless communication terminals stored in the memory. The controller is configured to send the invitation signal to the potential participant wireless communication terminals of the predefined list. The controller may be configured to scan an area for potential participant wireless communication terminals and to send the invitation signal to at least selected ones of the potential participant wireless communication terminals located by the scan.

According to some embodiments, the wireless communication module comprises a short range transmitter and the controller is configured to send the digital image file to each of the plurality of participant wireless communication terminals via the short range transmitter. The short range transmitter can be a Bluetooth transmitter. The short range transmitter can be a WLAN transmitter.

The wireless communication terminal may include a cellular telephone.

According to some embodiments, the at least one direct point-to-point wireless interface includes a direct point-to-multiple point interface between the wireless communication module and the plurality of participant wireless communication terminals.

According to further embodiments of the present invention, a system for providing a slideshow includes a host mobile wireless communication terminal and a plurality of participant wireless communication terminals. The host wireless communication terminal includes a wireless communication module and a controller. The wireless communication module is configured to communicate with other communication terminals over at least one direct point-to-point wireless interface. The controller is configured to establish a connection with each of the plurality of participant wireless communication terminals via the wireless communication module, to receive an image send command from a user, and to send a digital image file over the at least one direct point-to-point wireless interface to each of the plurality of participant wireless communication terminals as a group responsive to the image send command.

According to some embodiments, the at least one direct point-to-point wireless interface includes a direct point-to-multiple point interface between the wireless communication module and the plurality of participant wireless communication terminals.

According to further embodiments of the present invention, a method for providing a slideshow using a host wireless communication terminal includes: establishing a wireless connection between the host wireless communication terminal and a plurality of participant wireless communication terminals; receiving an image send command from a user; and sending a digital image file over at least one direct point-to-point wireless interface to each of the plurality of participant wireless communication terminals as a group responsive to the image send command.

According to further embodiments of the present invention, a mobile wireless communication terminal includes a wireless communication module and a controller. The wireless communication module is configured to communicate with other communication terminals over a wireless interface. The controller is configured to establish a slideshow session with at least one participant wireless communication terminal via the wireless communication module, and to send a series of digital image files to the at least one participant wireless communication terminal via the wireless communication module during the slideshow session such that the digital image files are automatically displayed on a display of the at least one participant wireless communication terminal.

The controller can be configured to send the series of digital image files to the at least one participant wireless communication terminal in a temporally spaced apart sequence.

The controller may be configured to send an invitation signal to the at least one participant wireless communication terminal to participate in the slideshow session, and to receive an acceptance signal from the at least one participant wireless communication terminal to participate in the slideshow session.

According to some embodiments, the wireless communication module is configured to communicate with the other communication terminals over a direct point-to-point wireless interface and the controller is configured to establish the slideshow session with the at least one participant wireless communication terminal and to send the series of digital image files to the at least one participant wireless communication terminal during the slideshow session via the direct point-to-point wireless interface.

According to some embodiments, the wireless communication module includes a short range transmitter and the controller is configured to send the digital image file to the at least one participant wireless communication terminal via the short range transmitter. The short range transmitter can be a Bluetooth transmitter. The short range transmitter can be a WLAN transmitter.

The wireless communication terminal may include a cellular telephone.

According to further embodiments of the present invention, a method for providing a slideshow using a host wireless communication terminal includes: establishing a wireless connection between the host wireless communication terminal and at least one participant wireless communication terminal; establishing a slideshow session with the at least one participant wireless communication terminal via the wireless communication module; and sending a series of digital image files to the at least one participant wireless communication terminal via the wireless communication module during the slideshow session such that the digital image files are automatically displayed on a display of the at least one participant wireless communication terminal.

According to some embodiments, the series of digital image files includes a first image file and at least one subsequent image file and the method includes: sending the first image file to the at least one participant terminal; displaying the first image file on the at least one participant terminal; sending the at least one subsequent image file to the at least one participant terminal while displaying the first image file on the at least one participant terminal; storing the at least one subsequent image file on the at least one participant terminal; and thereafter displaying the at least one subsequent image file on the at least one participant terminal.

According to some embodiments, a mobile wireless communication terminal includes a wireless communication module and a controller. The wireless communication module is configured to communicate with other communication terminals over at least one wireless interface. The controller is configured to establish a connection with each of a plurality of participant wireless communication terminals via the wireless communication module, to receive an image send command from a user, and to broadcast a digital image file over the at least one wireless interface to each of the plurality of participant wireless communication terminals as a group responsive to the image send command.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, "streamed" or "streaming" means that a file, such as an image file, is continuously sent via a digital signal to a receiving device where the image file is concurrently displayed via a suitable receiving application. The digital signal is typically buffered.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

Some embodiments of the present invention will now be described below with respect to FIGS. 1-5. Some embodiments of the present invention provide mobile wireless communication terminals capable of providing a slideshow including one or more digital image files on one or more participant wireless communication terminals.

Figure 1:
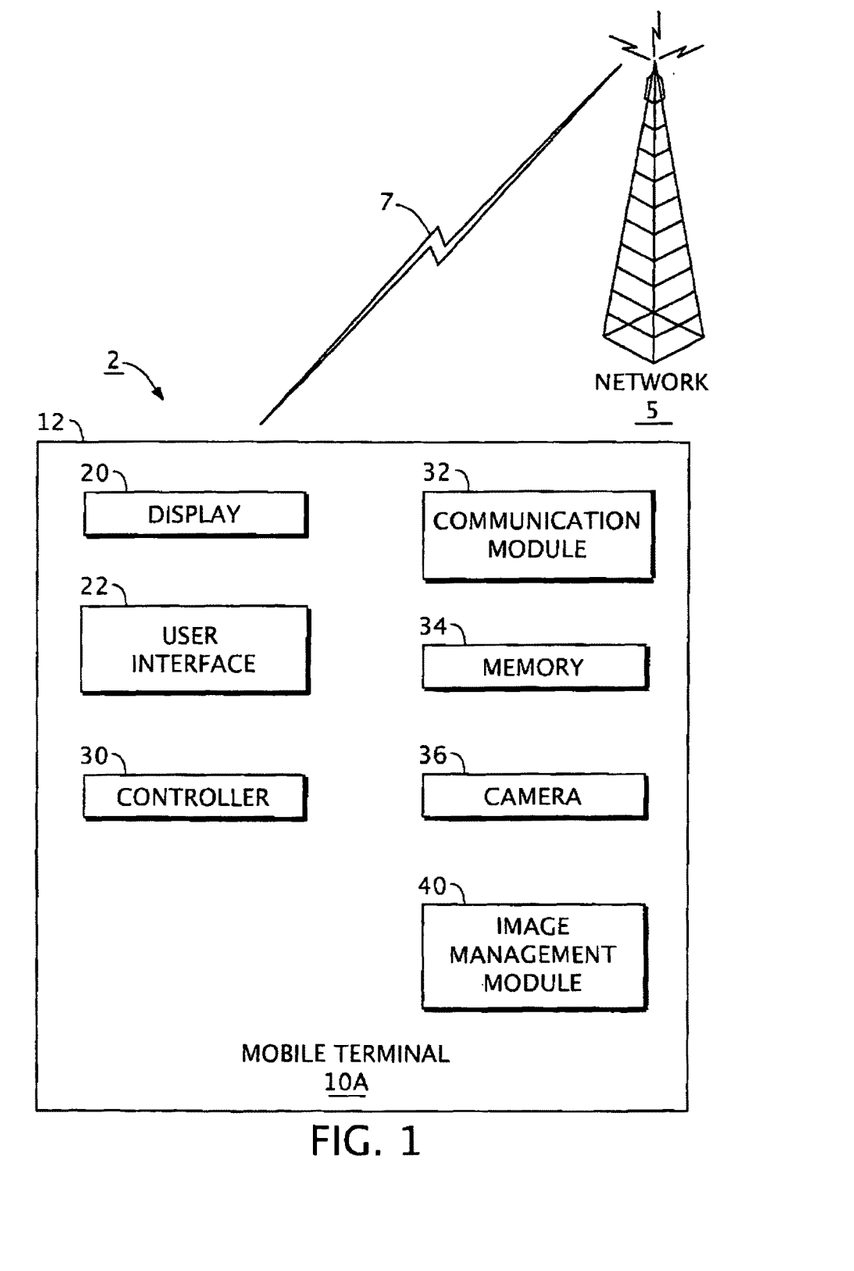
FIG. 1 is a schematic diagram of a mobile wireless communication terminal according to some embodiments of the present invention and an exemplary base station transceiver.

Referring now to FIG. 1, an exemplary mobile wireless communication terminal 10A in accordance with some embodiments of the present invention is illustrated. The wireless terminal 10A is configured to communicate data with one or more other wireless terminals over a direct wireless communication interface therebetween, over another wireless communication interface through one or more cellular base stations, and/or over another wireless communication interface through a wireless local area network (WLAN) router.

The wireless terminal 10A may be a mobile radiotelephone forming a part of a radiotelephone communication system 2 as illustrated in FIG. 1. The system 2 includes the mobile wireless communication terminal 10A and a base station transceiver, which is part of a wireless communications network 5. In some embodiments of the present invention, the network 5 includes a base station transceiver that includes the radio transceiver(s) that define an individual cell in a cellular network and communicates with the mobile terminal 10A (via an interface 7) and other mobile terminals in the cell using a radio-link protocol. It will be understood that, in some embodiments of the present invention, many base station transceivers may be connected through, for example, a mobile switching center and other devices to define the wireless communications network 5.

The mobile terminal 10A in the illustrated embodiments includes a portable housing assembly 12, a display 20, a user interface 22 (i.e., a man machine interface (MMI)), a controller 30, a communication module 32, a memory 34, and a camera device 36. The foregoing components of the mobile terminal 10A may be included in many conventional mobile terminals and their functionality is generally known to those skilled in the art. The mobile terminal 10A further includes an image management module 40, which may be stored in the memory 34.

The camera device 36 may be configured to generate a still or picture image and/or a video data stream based on incident light. The image or video stream can be stored in the memory 34, for example, as a representative digital image file or digital video file.

The display 20 may be any suitable display screen assembly. For example, the display screen 28 may be a liquid crystal display (LCD) with or without auxiliary lighting (e.g., a lighting panel).

The user interface 22 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The user interface 22 can include a speaker that generates sound responsive to an input audio signal. The user interface 22 can also include a microphone coupled to an audio processor that is configured to generate an audio data stream responsive to sound incident on the microphone.

The controller 30 may support various functions of the mobile terminal 10A. The controller 30 can be any commercially available or custom microprocessor, for example. In use, the controller 30 of the mobile terminal 10A generates a display image on the display 20.

The memory 34 is configured to store digital information signals and data such as a digital image signal and/or digital image files.

The communication module 32 is configured to communicate data over one or more wireless interfaces (e.g., wireless interfaces 112, 114, 116 as discussed herein (FIG. 4)) to another remote wireless terminal as discussed herein. The communication module 32 can include a cellular communication module, a direct point-to-point connection module, and/or a WLAN module.

With a cellular communication module, the wireless terminal 10A can communicate via the base station(s) of the network 5 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the wireless terminal 10A can communicate via an ad-hoc network through a direct point-to-point interface. The direct RF communication module may include a WLAN module.

With a WLAN module, the wireless terminal 10A can communicate through a WLAN router using a communication protocol that may include, but is not limited to, 802.11a, 802.11b, 802.11e, 802.11g, and/or 802.11i.

The communication module 32 can include a transceiver typically having a transmitter circuit and a receiver circuit, which respectively transmit outgoing radio frequency signals (e.g., to the network 5, a router or directly to another terminal) and receive incoming radio frequency signals (e.g., from the network 5, a router or directly to another terminal), such as voice and data signals, via an antenna. The communication module 32 may include a short range transmitter and receiver, such as a Bluetooth transmitter and receiver and/or a WLAN transmitter and receiver. The antenna may be an embedded antenna, a retractable antenna or any antenna known to those having skill in the art without departing from the scope of the present invention. The radio frequency signals transmitted between the mobile terminal 10A and the network 5, router or other terminal may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver may include an infrared (IR) transceiver configured to transmit/receive infrared signals to/from other electronic devices via an IR port.

The mobile terminal 10A may also be configured to electrically couple with another terminal via a wireline or cable for the transmission of digital communication signals therebetween.

According to some embodiments, the mobile terminal 10A is a handheld mobile terminal. By "handheld mobile terminal," it is meant that the outer dimensions of the mobile terminal are adapted and suitable for use by a typical operator using one hand. According to some embodiments, the total volume of the handheld mobile terminal 10A is less than about 200 cc. According to some embodiments, the total volume of the handheld terminal 10A is less than about 100 cc. According to some embodiments, the total volume of the handheld mobile terminal 10A is between about 50 and 100 cc. According to some embodiments, no dimension of the handheld mobile terminal 10A exceeds about 200 mm.

Figure 2:
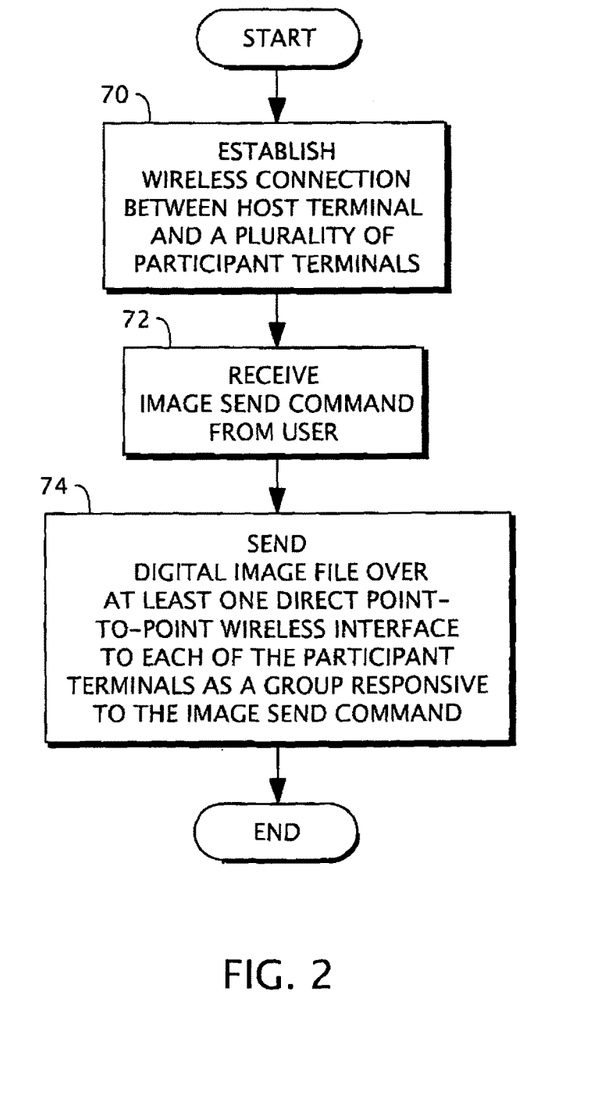
FIG. 2 is a flowchart illustrating methods in accordance with some embodiments of the present invention.

A method for providing a slideshow using a wireless communication terminal (e.g., the mobile terminal 10A) according to some embodiments of the present invention will now be described with reference to the flowchart of FIG. 2. Referring to the embodiments of FIG. 2, the method includes establishing a wireless connection between a host wireless communication terminal and a plurality of participant wireless communication terminals (Block 70). An image send command is received from a user (Block 72). A digital image file is sent over at least one direct point-to-point wireless interface to each of the plurality of participant wireless communication terminals as a group responsive to the image send command (Block 74). According to some embodiments, the direct point-to-point interface is a Bluetooth wireless RF connection.

Figure 3:
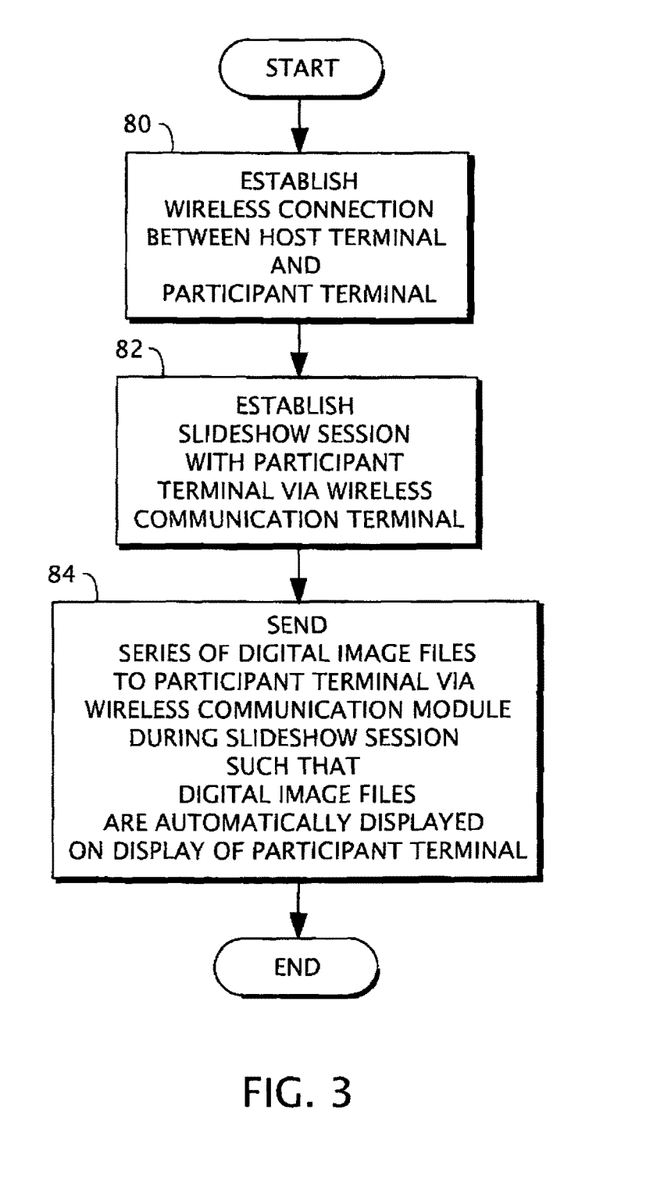
FIG. 3 is a flowchart illustrating methods in accordance with further embodiments of the present invention.

A method for providing a slideshow using a wireless communication terminal (e.g., the mobile terminal 10A) according to further embodiments of the present invention will now be described with reference to the flowchart of FIG. 3. Referring to the embodiments of FIG. 3, the method includes establishing a wireless connection between the host wireless communication terminal and at least one participant wireless communication terminal (Block 80). A slideshow session is established with at least one participant wireless communication terminal via the wireless communication module (Block 82). A series of digital image files are sent to the at least one participant wireless communication terminal via the wireless communication module during the slideshow session such that the digital image files are automatically displayed on a display of the at least one participant wireless communication terminal (Block 84). According to some embodiments, the wireless communication module is configured to communicate with other communication terminals over a direct point-to-point wireless interface and the controller is configured to establish the slideshow session with the at least one participant wireless communication terminal and to send the series of digital image files to the at least one participant wireless communication terminal during the slideshow session via the direct point-to-point wireless interface. According to some embodiments, the direct point-to-point interface is a Bluetooth wireless RF connection.

Methods according to embodiments of the present invention may include a combination of the methods of described with reference to FIGS. 2 and 3. Further aspects and embodiments of methods in accordance with the present invention will be apparent from the following descriptions of further embodiments.

Figure 4:
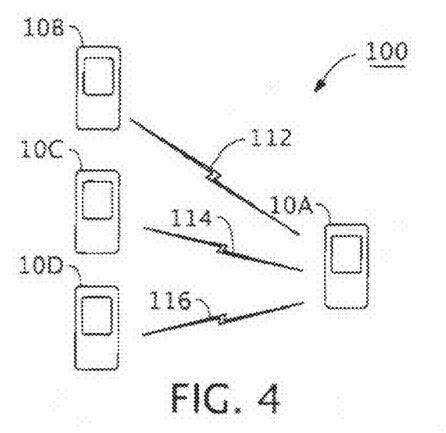
FIG. 4 is a schematic diagram of a slideshow display system according to some embodiments of the present invention including the mobile wireless communication terminal of FIG. 1.

With reference to FIG. 4, a slideshow display system 100 according to embodiments of the present invention is shown therein. The system 100 includes the mobile wireless communication terminal 10A (also referred to herein as the "host wireless communication terminal" or "host terminal") and a plurality of additional participant wireless communication terminals 10B, 10C, and 10D (also referred to herein as the "participant wireless communication terminals" or "participant terminals").

The terminals 10B-D may be configured as described above with regard to the terminal 10A. The terminals 10B-D each include a wireless communication module 32 and an image management module 40. However, the respective image management modules may be differently configured for each terminal 10A-D depending on the intended functionality of the device. According to some embodiments, all or some of the terminals 10B-D are mobile wireless communication terminals. According to some embodiments, all or some of the terminals 10A-D are handheld mobile wireless communication terminals.

The system 100 will now be described using an illustrative example of use. A group of users at a gathering each have a respective one of the terminals 10A-D. Various image files are stored on the host terminal 10A. The host may wish to share some or all of the image files stored on his mobile terminal 10A with the other users at the gathering. Displaying the images on the host's own mobile terminal 10A for viewing by the other users may be cumbersome or infeasible. A properly equipped media center may be unavailable, unsuitable and/or undesirable for use. With known and available technology, the image files can be sent file-by-file and participant-by-participant to the participants' own terminals 10B-D using a wireless interface (e.g., via MMS, Bluetooth, etc.). Each participant can then view the image files on his or her own display. While this approach may be preferable to the other conventionally available options, it may require a substantial amount of work by the host and may be time-consuming and inconvenient. This approach may also be inconvenient for the participants, who typically must actively interact with their mobile terminal (e.g., toggle through the images files) to accept, access and view the image files.

In accordance with embodiments of the present invention, the foregoing shortcomings can be overcome by establishing a slideshow session and executing a slideshow using the host terminal 10A. Typically, each terminal 10A-D will have the appropriate image management module 40 (e.g., software or firmware application) installed thereon. The respective image management modules 40 and controllers 30 of the host and participant terminals may cooperate to provide the communication, display, connection and other functionality and operations described herein.

To initiate the slideshow procedure, the host instructs the controller 30 of the host terminal 10A to invoke the slideshow function. For example, the slideshow procedure may be initiated by selecting a "GROUP SLIDESHOW" function or the like from a menu of the host terminal 10A. The function may be provided as an option in a menu in a picture view mode of the host terminal 10A.

The controller 30 of the host terminal 10A establishes a wireless connection (i.e., communicatively couples) with each of the participant terminals 10B-D. According to some embodiments, the wireless connection is a direct point-to-point wireless communication interface connection, according to some embodiments, a direct point-to-point RF connection and, according to some embodiments, a Bluetooth connection. The connections may be established in a known manner. For example, in the case of Bluetooth connections, the participant (slave) terminals 10B-D may be set to a searchable/discoverable state and the host (master) terminal 10A emits an inquiry to identify the available participant (slave) terminals 10B-D to form a piconet or personal area network.

As illustrated, the host terminal 10A communicates with the participant terminals 10B, 10C and 10D via direct point-to-point wireless interfaces or links 112, 114 and 116, respectively. According to some embodiments, the host terminal 10A may communicate with a further participant terminal via wireless interfaces or links through a WLAN router. According to some contemplated embodiments, all of the signals provided between the host terminal 10A and the participant terminals 10B-D to execute the slideshow procedure are provided via direct point-to-point wireless interfaces. According to some contemplated embodiments, all of the signals provided between the host terminal 10A and the participant terminals to execute the slideshow procedure are provided via direct wireless radio frequency (RF) interfaces such as Bluetooth interfaces.

Before or after establishing the connections, the host terminal 10A may allow the host to identify and designate valid participant terminals by any suitable method. The host terminal 10A may be used to define specific, predefined groups such as a group of the potential participant terminals that will be permitted to participate and/or a group of the potential participant terminals that may be invited to join the participant group. One or more predefined groups may be stored on the host terminal 10A in the memory 34 for subsequent retrieval and use.

The host terminal 10A then sends an invitation signal to each of the participant terminals 10B-D. For example, the invitation signal may cause the receiving participant terminals 10B-D to display to the respective end users an inquiry such as "TOMAS K750 WOULD LIKE TO RUN A SLIDESHOW ON YOUR PHONE. DO YOU ACCEPT?" Each potential participant may then operate his or her participant terminal 10B-D to reply to the host terminal 10A with an acceptance signal. For example, the participant terminals 10B-D may provide "YES" and "NO" soft keys for responding. The controller 30 of the host terminal 10A then adds the accepting participant terminals to a slideshow distribution group list.

The host may selectively control which of the available participant terminals receive the aforementioned invitation signals. The host terminal 10A may provide suitable menu options (e.g., in the form of soft keys) such as "CHOOSE GROUP" and "SEARCH FOR PHONES".

If the "CHOOSE GROUP" option is selected, the host terminal 10A allows the host to select from one or more predefined groups of participant terminals, the members of which will thereafter receive an invitation signal and may join the slideshow distribution group by replying as discussed above.

According to some embodiments, if the "SEARCH FOR PHONES" option is selected, the host terminal 10A will scan the area to identify the available potential participant terminals (e.g., those within operational range of the host terminal's Bluetooth signal). The controller 30 will generate a list of the available potential participants. The host may select (e.g., using check boxes) the potential participant terminals to which an invitation signal will be sent. The potential participant terminals may then opt in by replying with an acceptance signal to accept the invitation and join the slideshow distribution group.

In the foregoing manner, the participant slideshow distribution group is set and connections are established between the host terminal 10A and each of the participant terminals in the participant slideshow distribution group (as illustrated, the participant terminals 10B-D). Once the connections are established between the host terminal 10A and the participant terminals 10B-D, the host can establish and execute a slideshow session. During the slideshow session, the host terminal 10A sends image files to the participant terminals 10B-D of the slideshow distribution group, and the receiving participant terminals 10B-D display these image files on their respective display screens.

Figure 5:
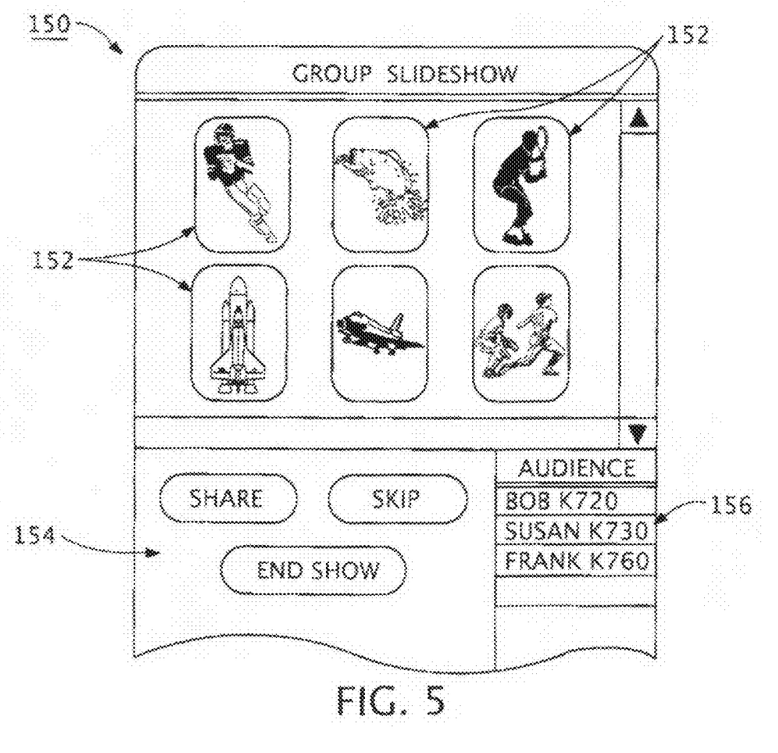
FIG. 5 is a schematic diagram illustrating a display of the mobile wireless communication terminal of FIG. 1 in accordance with some embodiments of the present invention.

The host terminal 10A may provide the host with an interface that allows the host to preview images before sending them and to selectively withhold image files from the slideshow as desired. By way of illustration, the image management module 40 provides a user interface display on the host terminal 10A such as a display 150 as shown in FIG. 5, which is merely exemplary. In the illustrated embodiment, the display 150 includes image thumbnails 152, control buttons 154, and a participant listing 156 (under the heading "AUDIENCE"). The host can then select the thumbnail 152 corresponding to each image the host wishes to include in the slideshow. After a thumbnail is selected, the host hits the "SHARE" button to send the image to the participant terminals 10B-D. Alternatively, the image management module 40 may enable the host to select multiple thumbnails for the slideshow before sending the corresponding image files to the participants. The host may be enabled to send a pre-existing group or set of image files. The image management module 40 may allow the host to edit or modify the group of images (e.g., delete selected images) before distributing.

Other techniques may be employed to enable selection of the slideshow images. For example, the image management module 40 may list available image files by name and allow the host to select (e.g., using check boxes) the image files for the slideshow. The image management module 40 may display each image file in turn and allow the host to either skip the image file or send it as part of the slideshow.

Various other ways of structuring the slideshow will be apparent to those of skill in the art upon reading the description herein. In addition to determining the image files to be included in the slideshow, the image management module 40 may enable the user to select other parameters such as image resolution, image display time, transition time between display of images, transition type (e.g., immediate replacement, fade in, fade out, intervening blackout, etc.), image background, etc. It will be appreciated that more, less and/or different information may be provided in the display 150 as well.

The slideshow may be automated such that image after image is distributed without requiring the host to individually command the controller 30 to send each image file. Alternatively, the image files may be distributed one at a time responsive to respective send commands from the host to the host terminal 10A. In either case, the host actuates a send or share command to the controller 30 of the host terminal 10A, responsive to which the controller 30 of the host terminal 10A then sends a digital image file to each of the participant terminals 10B-D as a group. That is, the controller 30 executes the send command by sending the image file to each member of the slideshow distribution group so that the host is not required to send the image file to each participant terminal individually (i.e., by separately activating a send command for each participant terminal). Responsive to the send command or commands, the image files may be sent to the distribution group in series or succession for serial display as a slideshow.

Each distributed image file may be stored on the participant terminal for display. Alternatively, the image file may be streamed to the participant terminal. According to some embodiments, the image file, whether streamed or stored in whole, will be automatically erased (i.e., without user intervention) from the host terminal 10A after display during the slideshow. According to some embodiments, the digital image files are sent from the host terminal 10A to the participant terminals 10B-D serially and in temporally spaced apart sequence so that the number of such image files stored on each participant terminal can be limited. According to some embodiments, each such image file is automatically erased during and/or before receipt of the next image file.

According to some embodiments, the host terminal 10A pre-selects or identifies a specified set of image files to be included in the slideshow. For example, the set may be comprised of "pictures taken in May 2004", from a specified "share folder", or the like. When the slideshow session is initiated, the first image file is sent to the participant terminals 10B-D as described herein and the other image files of the specified set are also sent wirelessly to the participant terminals 10B-D "in the background". These other image files are stored locally on the participant terminals 10B-D to await subsequent display thereon. According to some embodiments, the host terminal 10A sends the subsequent image files while the first image file is being displayed. For example, the latter nine of a set of ten image files may be wirelessly sent to and stored on the participant terminals 10B-D while the first image of the set is being displayed. When it is time to view a stored image file, the controller 30 of the host terminal 10A sends a signal to each participant terminal 10B-D to display the stored image file. According to some embodiments, the host terminal 10A sends a short command or pointer to the participant terminals 10B-D instructing or causing the participant terminals 10B-D to display the chosen image file (e.g., "show pic DSC0232") instead of sending the image file itself. Such embodiments may have the advantage that it is not necessary to wait for each image file (which may be relatively large) to be sent to and loaded onto the participant terminals 10B-D after display of the previous image file. This may serve to speed up the slideshow and minimize delay or the impression of delay. According to some embodiments, the stored files are temporarily stored on the participant terminals 10B-D and may be automatically erased after display.

The controller 30 of the host terminal 10A may execute the foregoing steps for each image file in turn and automatically (i.e., without user intervention).

According to some embodiments, responsive to the image send command from the host, each image file is sent to the participant terminals 10B-D such that it is displayed simultaneously on the displays of each of the plurality of participant terminals 10B-D. In this way, the images can be simultaneously viewed by the participants as if they were viewing the same display. According to some embodiments, each image file is sent to the participant terminals 10B-D such that it is first displayed on each participant terminal substantially simultaneously (i.e., such that any delay in initiation of display of the image file as between participant terminals is not readily perceptible to the end users). According to some embodiments, responsive to the send command, the data signal(s) or packet(s) embodying the image file are sent by the host terminal to the participant terminals substantially simultaneously. In this case, a shared signal may be issued by the host terminal and received by multiple participant terminals. Alternatively, separate signals may be issued to respective ones of the participant terminals simultaneously or without deliberate delays between issuance of the separate signals. According to some embodiments, the time period between issuance of each such separate signal and the next does not exceed one second.

According to some embodiments, during the slideshow session, the image files are "pushed" by the host terminal 10A onto the participant terminals 10B-D. Once the slideshow session has been established, the image files received by the participant terminals from the host terminal 10A are automatically displayed by the participant terminals without requiring further action by the participant. That is, once a participant terminal 10B-D has accepted the invitation to join the slideshow, the images are displayed in series without requiring the participant to accept each image file from the host terminal 10A. According to some embodiments, each image file is sent to the participant terminals such that the image file is automatically simultaneously displayed on each participant terminal. According to some embodiments, each image file is sent to the participant terminals such that the image file is automatically first displayed (i.e., the display is automatically initiated) on each participant terminal substantially simultaneously.

As the host terminal 10A runs through the image files in this fashion, the host may modify the not yet shown portion of the slideshow as desired. According to some embodiments, new participant terminals can join the group and receive the slideshow as the host terminal 10A runs through the slideshow.

The digital image files sent by the host terminal 10A to the participant terminals 10B-D may be any suitable image files. According to some embodiments, the distributed image files are copies of image files stored in the memory (e.g., the memory 34) of the host terminal 10A. The image files may be digital picture files. The image files may be copies of picture files acquired using the camera device 36.

The system 100 can provide a convenient and enjoyable system for displaying image files to others, particularly in a slideshow format. The system 100 can also allow the host terminal to create, coordinate, control and/or manage the slideshow.

While slideshows including a series of image files are discussed above, according to some embodiments, a slideshow may include only a single image file.

While the system 100 as described includes a plurality of participant terminals, according to other embodiments only a single participant terminal is included in the slideshow distribution group. In particular, according to some embodiments, a slideshow session is established between the host terminal 10A and the participant terminal, a series of digital image files are sent from the host terminal 10A to the participant terminal during the slideshow session, and the image files are pushed onto and automatically displayed on the participant terminal during the slideshow session without requiring further input such as image-by-image acceptance from the participant terminal. For example, the acceptance of an invitation to join a slideshow may be the only response required of the participant terminal in order to view a multi-image, serial slide show.

As will be appreciated from the foregoing description, all or some of the direct point-to-point wireless interface connections between the host terminal 10A and the participant terminals 10B-D may be direct point-to-multiple point wireless interface connections. The signals sent by the host terminal 10A to the participant terminals 10B-D may be sent via direct point-to-multiple point wireless interface connections.

According to some embodiments, the signals are broadcast by the host terminal 10A to the participant terminals 10B-D. For example, the image files may be broadcast by the host terminal 10A to the participant terminals 10B-D to effect a slideshow as described herein.

The application programs described herein, including the image management module 40, are illustrative of programs that implement various features according to embodiments of the present invention. It will be appreciated that other and/or additional application programs may be employed in accordance with embodiments of the present invention.

Although FIG. 1 illustrates an exemplary hardware/software architecture that may be used in mobile terminals and/or other electronic devices for providing a slideshow, it will be understood that the present invention is not limited to such a configuration but is intended to encompass any configuration capable of carrying out operations described herein. For example, although the memory 34 is illustrated as separate from the controller 30, the memory 34 or portions thereof may be considered as a part of the controller 30. More generally, while particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multi-processor system in accordance with various embodiments of the present invention.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A mobile wireless communication terminal comprising:
    a wireless communication module including a transmitter and configured to communicate with other communication terminals over at least one direct point-to-point wireless interface; and
    a controller that is configured to establish a connection with each of a plurality of participant wireless communication terminals via the wireless communication module, to receive an image send command from a user, to establish a slideshow session with each of the plurality of participant wireless communication terminals via the wireless communication module, to send a series of digital image files over the at least one direct point-to-point wireless interface to each of the plurality of participant wireless communication terminals as a group responsive to the image send command during the slideshow session such that the first digital image file is automatically displayed on respective displays of each of the plurality of participant wireless communication terminals and the other digital image files are stored in each of the plurality of participant wireless communication terminals and to automatically send, without user intervention at the mobile wireless communication terminal, a pointer to each of the plurality of participant wireless communication terminals as a group when it is time to view one of said stored image files such that the stored image file is automatically displayed on respective displays of each of the plurality of participant wireless communication terminals.

2. The mobile wireless communication terminal of claim 1, wherein the series of digital image files comprises the first digital image file and at least one subsequent digital image file that is stored in the at least one participant wireless communication terminal, and wherein the controller is configured to send the series of digital image files to the plurality of participant wireless communication terminals in a temporally spaced apart sequence such that the at least one subsequent image file is sent to the at least one participant wireless communication terminal while the first image file is displayed on the at least one participant wireless communication terminal.

3. The mobile wireless communication terminal of claim 1, wherein the controller is configured to send an invitation signal to each of the participant wireless communication terminals to participate in the slideshow session, and to receive an acceptance signal from each of the participant wireless communication terminals to participate in the slideshow session, wherein the controller is configured to automatically establish the slideshow session in direct response to the acceptance signal from each of the participant wireless communication terminals.

4. The mobile wireless communication terminal of claim 3, including a memory and a predefined list designating potential participant wireless communication terminals stored in the memory, wherein the controller is configured to send the invitation signal to the potential participant wireless communication terminals of the predefined list.

5. The mobile wireless communication terminal of claim 3, wherein the controller is configured to scan an area for potential participant wireless communication terminals and to send the invitation signal to at least selected ones of the potential participant wireless communication terminals located by the scan.

6. The mobile wireless communication terminal of claim 1, wherein the wireless communication module comprises a short range transmitter and the controller is configured to send the digital image file to each of the plurality of participant wireless communication terminals via the short range transmitter.

7. The mobile wireless communication terminal of claim 6, wherein the short range transmitter is a Bluetooth transmitter.

8. The mobile wireless communication terminal of claim 6, wherein the short range transmitter is a WLAN transmitter.

9. The mobile wireless communication terminal of claim 1, wherein the mobile wireless communication terminal includes a cellular telephone.

10. The mobile wireless communication terminal of claim 1, wherein the at least one direct point-to-point wireless interface includes a direct point-to-multiple point interface between the wireless communication module and the plurality of participant wireless communication terminals.

11. A system for providing a slideshow, the system comprising:
    a host mobile wireless communication terminal; and
    a plurality of participant wireless communication terminals;
    wherein the host mobile wireless communication terminal includes:
        a wireless communication module including a transmitter and configured to communicate with other communication terminals over at least one direct point-to-point wireless interface; and
        a controller that is configured to establish a connection with each of the plurality of participant wireless communication terminals via the wireless communication module, to receive an image send command from a user, to establish a slideshow session with each of the plurality of participant wireless communication terminals via the wireless communication module, to send a series of digital image files over the at least one direct point-to-point wireless interface to each of the plurality of participant wireless communication terminals as a group responsive to the image send command during the slideshow session such that the first digital image file is automatically displayed on respective displays of each of the plurality of participant wireless communication terminals and the other digital image files are stored in each of the plurality of participant wireless communication terminals and to automatically send, without user intervention at the host mobile wireless communication terminal, a pointer to each of the plurality of participant wireless communication terminals as a group when it is time to view one of said stored image files such that the stored image file is automatically displayed on respective displays of each of the plurality of participant wireless communication terminals.

12. The system of claim 11, wherein the at least one direct point-to-point wireless interface includes a direct point-to-multiple point interface between the wireless communication module and the plurality of participant wireless communication terminals.

13. A method for providing a slideshow using a host wireless communication terminal, the method comprising:
   establishing a wireless connection between the host wireless communication terminal and a plurality of participant wireless communication terminals via a wireless communication module including a transmitter;
   receiving an image send command from a user;
   establishing a slideshow session with each of the plurality of participant wireless communication terminals via the wireless communication module,
   sending a series of digital image files over at least one direct point-to-point wireless interface to each of the plurality of participant wireless communication terminals as a group responsive to the image send command during the slideshow session such that the first digital image file is automatically displayed on respective displays of each of the plurality of participant wireless communication terminals and the other digital image files are stored in each of the plurality of participant wireless communication terminals, and
   automatically sending, without user intervention at the host mobile wireless communication terminal, a pointer to each of the plurality of participant wireless communication terminals as a group when it is time to view one of said stored image files such that the stored image file is automatically displayed on respective displays of each of the plurality of participant wireless communication terminals.

14. The method of claim 13, further comprising automatically erasing each respective media file from each of the plurality of participant wireless communication terminals after the respective media file has been displayed.

15. A mobile wireless communication terminal comprising:
   a wireless communication module including a transmitter and configured to communicate with other communication terminals over a wireless interface; and
   a controller that is configured to send an invitation signal to at least one participant wireless communication terminal, to receive an acceptance signal from the at least one participant wireless communication terminal to participate in a slideshow session, to automatically establish the slideshow session with the at least one participant wireless communication terminal via the wireless communication module in direct response to the acceptance signal from the at least one participant wireless communication terminal, to send a series of digital image files to the at least one participant wireless communication terminal via the wireless communication module during the slideshow session such that the first digital image file is automatically displayed on a display of the at least one participant wireless communication terminal and the other digital image files are stored in the at least one participant wireless communication terminal and to automatically send, without user intervention at the mobile wireless communication terminal, a pointer to the at least one participant wireless communication terminal when it is time to view one of said stored image files such that the stored image file is automatically displayed on the display of the at least one participant wireless communication terminal.

16. The mobile wireless communication terminal of claim 15, wherein the series of digital image files comprises the first digital image file and at least one subsequent digital image file that is stored in the at least one participant wireless communication terminal, and wherein the controller is configured to send the series of digital image files to the at least one participant wireless communication terminal in a temporally spaced apart sequence such that the at least one subsequent image file is sent to the at least one participant wireless communication terminal while the first image file is displayed on the at least one participant wireless communication terminal.

17. The mobile wireless communication terminal of claim 15, wherein:
   the wireless communication module is configured to communicate with the other communication terminals over a direct point-to-point wireless interface; and
   the controller is configured to establish the slideshow session with the at least one participant wireless communication terminal and to send the series of digital image files to the at least one participant wireless communication terminal during the slideshow session via the direct point-to-point wireless interface.

18. The mobile wireless communication terminal of claim 15, wherein the wireless communication module comprises a short range transmitter and the controller is configured to send the digital image file to the at least one participant wireless communication terminal via the short range transmitter.

19. The mobile wireless communication terminal of claim 18, wherein the short range transmitter is a Bluetooth transmitter.

20. The mobile wireless communication terminal of claim 18, wherein the short range transmitter is a WLAN transmitter.

21. The mobile wireless communication terminal of claim 15, wherein the mobile wireless communication terminal includes a cellular telephone.

22. A method for providing a slideshow using a host wireless communication terminal, the method comprising:
   establishing a wireless connection between the host wireless communication terminal and at least one participant wireless communication terminal via a wireless communication module including a transmitter;
   establishing a slideshow session with the at least one participant wireless communication terminal via the wireless communication module;
   sending a first image file to the at least one participant wireless communication terminal;
   automatically displaying the first image file on the at least one participant wireless communication terminal;
   sending at least one subsequent image file to the at least one participant wireless communication terminal while displaying the first image file on the at least one participant wireless communication terminal;
   storing the at least one subsequent image file on the at least one participant wireless communication terminal; and thereafter
   automatically sending a pointer to the at least one participant wireless communication terminal when it is time to view the at least one subsequent image file such that the at least one subsequent image file is automatically displayed on the at least one participant wireless communication terminal.

23. A mobile wireless communication terminal comprising:
- a wireless communication module including a transmitter and configured to communicate with other communication terminals over at least one wireless interface; and
- a controller that is configured to establish a connection with each of a plurality of participant wireless communication terminals via the wireless communication module, to receive an image send command from a user, to establish a slideshow session with each of the plurality of participant wireless communication terminals via the wireless communication module, to broadcast a series of digital image files comprising a first image file and at least one subsequent image file over the at least one wireless interface to each of the plurality of participant wireless communication terminals as a group responsive to the image send command during the slideshow session such that the first digital image file is automatically displayed on respective displays of each of the plurality of participant wireless communication terminals while the at least one subsequent image file is sent to and stored in each of the plurality of participant wireless communication terminals and to automatically send a pointer to each of the plurality of participant wireless communication terminals as a group when it is time to view the at least one subsequent image file such that the at least one subsequent image file is automatically displayed on respective displays of each of the plurality of participant wireless communication terminals.

* * * * *